United States Patent [19]

Feiker

[11] 4,173,754

[45] Nov. 6, 1979

[54] DISTRIBUTED CONTROL SYSTEM

[75] Inventor: George E. Feiker, Schenectady, N.Y.

[73] Assignee: General Electric Company, Schenectady, N.Y.

[21] Appl. No.: 809,939

[22] Filed: Jun. 24, 1977

Related U.S. Application Data

[63] Continuation-in-part of Ser. No. 778,719, Mar. 17, 1977, abandoned.

[51] Int. Cl.² ............................................ H04M 11/00
[52] U.S. Cl. ............................ 340/310 R; 340/310 A; 340/151; 340/163
[58] Field of Search ............... 340/310 A, 310 R, 151, 340/163

[56] References Cited

U.S. PATENT DOCUMENTS

| | | | |
|---|---|---|---|
| 3,359,551 | 12/1967 | Dennison | 340/147 X |
| 3,900,842 | 8/1975 | Calabro | 340/310 A |
| 3,914,757 | 10/1975 | Finlay | 340/151 |
| 3,925,763 | 12/1975 | Wadhwani | 340/147 X |
| 4,012,734 | 3/1977 | Jagoda | 340/151 |
| 4,021,615 | 5/1977 | James | 340/147 X |
| 4,021,797 | 5/1977 | Hofmeister | 340/147 X |
| 4,022,977 | 5/1977 | Nomura | 340/151 |

OTHER PUBLICATIONS

T. K. McGowan et al., "A New Approach to Lighting System Control", *Journal of the Illuminating Engineering Society*, pp. 38-43, 10/76.
J. Wilson, "An Architectural Energy—Conserving Electronic Dimming System" *Lighting Design and Application*, pp. 6-7, 1/76.
Honeywell Brochure, The Intelligent Approach to Energy Management.

*Primary Examiner*—Harold I. Pitts
*Attorney, Agent, or Firm*—Geoffrey H. Krauss; Joseph T. Cohen; Marvin Snyder

[57] ABSTRACT

A redundant digital address and function code is generated at a central location and transmitted through a signal circuit or an A.C. power distribution circuit to a plurality of receiver locations. At each addressed receiver location, the encoded function is performed to control selected loads in a predetermined manner. A signal may be transmitted back to the central location for controlling a pre-programmed combination of loads in response thereto.

9 Claims, 5 Drawing Figures

DISTRIBUTED CONTROL SYSTEM

REFERENCE TO RELATED APPLICATION

This application is a continuation-in-part of application Ser. No. 778,719, filed Mar. 17, 1977, now abandoned.

BACKGROUND OF THE INVENTION

This invention relates to signal distribution systems, and more particularly to a system for communicating data for control of individual loads in a system.

In commercial buildings or other facilities, lighting, heating, ventilating, air-conditioning and other loads can be controlled according to requirements determined by computer so as to optimize energy usage. A significantly greater overall reduction in energy usage may thereby be achieved, provided that control can be extended, individually, to a large number of separate loads so as to achieve a much finer control mesh than provided by present control systems. In general, the larger the building, the greater the potential for energy savings. Moreover, computer determination of optimum load controls is important if it is desired to eliminate the need to have these load controls manipulated manually several times each day at a plurality of remote locations.

Control signals generated by a microcomputer may be distributed to each switched fixture load in the system by transmission through the power distribution circuits (which are typically A.C.) in the facility or, in the alternative, through a communication circuit within the facility, on a frequency modulated carrier. If necessary, a separate microcomputer may be employed for each of the lighting, heating, ventilating, air-conditioning and other systems in the building. The microcomputer may be easily programmed to the requirements of each separate system of fixtures in the building, and provides an economical means of storing, in semiconductor memory, information on desired states of a large number of individually switched devices within the system. If several systems are employed in a single building or other facility, overall control of the systems may be accomplished by a master microcomputer or by a central process control computer.

Accordingly, one object of the invention is to provide a method and apparatus for generating redundant address and function codes for transmission to a plurality of receiving stations.

Another object is to provide a method and apparatus for transmitting function data over power distribution or communication circuits to selected receiving stations.

Another object is to provide a system for transmitting control signals, generated at any of a plurality of receiving stations, back to a central control location over power distribution or communication circuits for purposes of controlling a pre-programmed combination of loads.

SUMMARY OF THE INVENTION

Briefly, in accordance with a preferred embodiment of the invention, a system for performing, from a central location, a selected one of a plurality of electrical functions at a selected one of a plurality of remote locations comprises a central processing unit, encoding means responsive to the central processing unit for generating a predetermined digital word, and means coupling each of the remote locations to the encoding means. Receiver-decoder means are provided at each of the remote locations, each of the respective receiver-decoder means having its own unique address code and a common address code unique to each of the remote locations. Means responsive to each of the receiver-decoder means, respectively, are also provided for performing the selected one of the plurality of electrical functions at the selected one of the plurality of remote locations. Additionally, means are provided at selected ones of the remote locations for generating control information for transmission back to the central processing unit in order to control a pre-programmed combination of loads responsive to that particular control signal.

In accordance with another preferred embodiment of the invention, a method of performing a selected electrical function at a selected one of a plurality of remote locations from a central location comprises redundantly generating a predetermined number of digital words, transmitting the generated words to each of the remote locations, decoding each of the transmitted words at each of the remote locations, and detecting a predetermined address in each of the digital words at each of the selected remote locations. The selected function is performed at the selected remote locations when identical digital words having the predetermined address have appeared at the selected remote location a predetermined number of times out of the number of times the digital words have been redundantly generated at the central location. Additionally, control information generated at any of the remote locations is transmitted back to the central processing unit for controlling a pre-programmed combination of loads responsive to that particular control signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
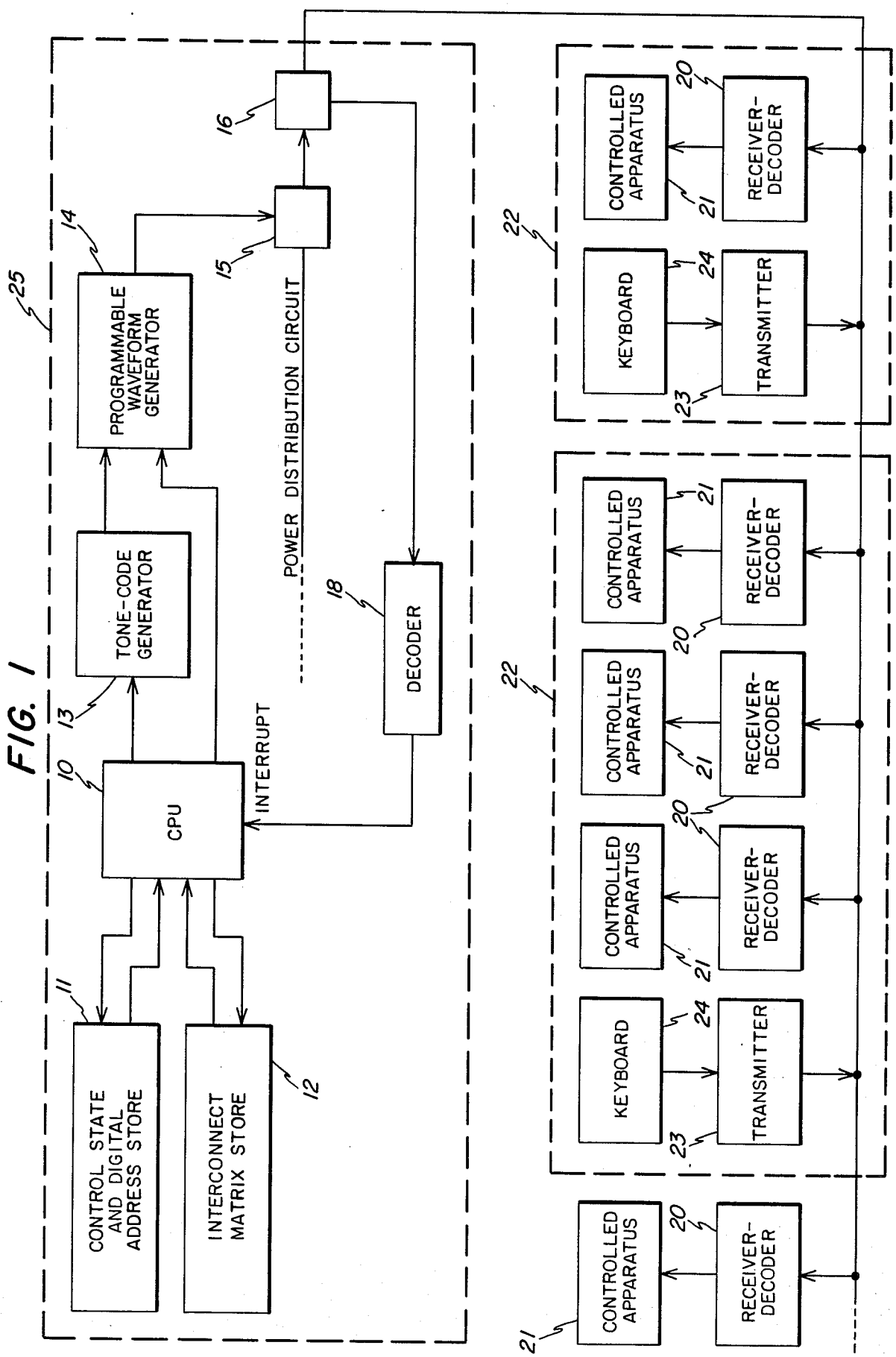
FIG. 1 is a block diagram of a signal distribution system, connected in accordance with the instant invention, employing single or parallel branch distribution.

In FIG. 1, a signal distribution system, constructed in accordance with the instant invention, is illustrated as comprising a central processor unit (or CPU) 10, at a central apparatus location 25. CPU 10 may typically comprise a commercially available microcomputer such as an Intel 8080A. A control state and digital address store 11 coupled to CPU 10 and typically comprising a random access solid-state memory such as an Intel 8708, stores assigned frequency allocations and modulation codes. Similarly, an interconnect matrix store 12, also coupled to CPU 10 and typically comprising a random access solid-state memory similar to control state and digital address store 11, digitally stores, under control of CPU 10, combinations of control states corresponding to particular remote receiver-decoder addresses. Those skilled in the art will appreciate that stores 11 and 12 could be combined into a single store, if desired.

Figure 5:
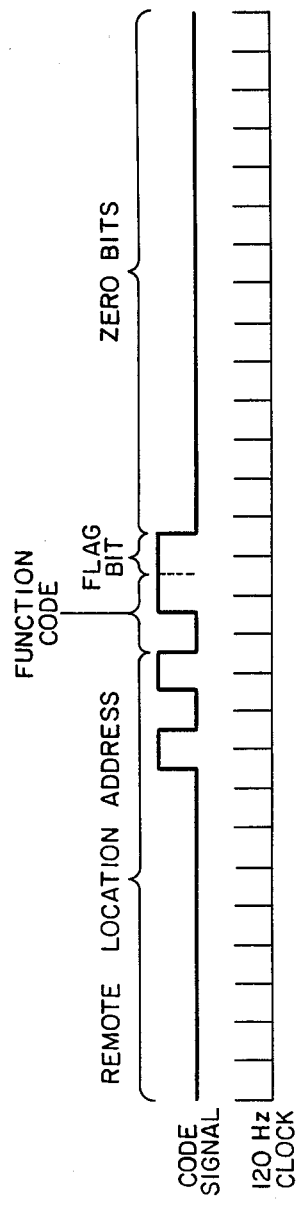
FIG. 5 is a pulse waveform illustration of a typical digital word portion of a transmitted signal.

A programmable waveform generator 14, such as a Wavetek Model 154, is connected to CPU 10 and generates a frequency shift keyed (FSK) carrier modulated with a digital word of a predetermined number of bits, such as fourteen, in response to a low-level signal from the CPU. The digital word consists of address and function data. Selection of the digital word is made according to signals from the CPU. A typical fourteen bit digital word is illustrated in FIG. 5. The bit preceding the function code is always a ONE, to serve as a flag bit that signifies to the receiving apparatus that a digital word is about to be received and that function information will follow immediately. The next two bits serve to carry function information for the load to be controlled. The final twelve bits constitute address information, designating which load is intended to receive the function information. CPU 10 causes waveform generator 14 to repeat the generated word so that the word is transmitted several times (such as three) in succession, rendering redundant the transmitted address and function code.

Provision is made for tone-code modulation of programmable waveform generator 14 by a tone-code generator 13, such as a Frequency Devices, Inc. Model 510 encoder, when a remote address is generated, thereby providing for tone-coded as well as digitally-encoded carrier frequencies.

Use of a programmable waveform generator permits assignment of different frequencies to different branch circuits or to subsystem combinations of receiver-decoders, thereby reducing the number of different digital addresses necessary for a given number of receiver-decoders.

Frequency-shifted keyed signals on a high frequency carrier are introduced onto the power distribution circuit for the facility in which the apparatus of the instant invention is to be installed, by being coupled thereto at a junction 15. For transmitting signals on power circuits, jucntion 15 typically comprises a filter which avoids deleterious interaction between the power current and the signal; that is, the signal is confined to the part of the distribution circuit on which the loads are to be controlled, and low frequency noise originating elsewhere in the power system is attenuated with respect to the output of programmable waveform generator 14 (which provides output frequencies at least two orders of magnitude greater than the power frequency). It will be evident to those skilled in the art that, in the alternative, a communications line may be employed to distribute the signal through the facility and, in such case, junction 15 comprises a directional coupler.

A second junction 16, comprising a filter or a directional coupler, passes signals from junction 15 to receiving apparatus at remote locations within the facility in which the apparatus is installed. In addition, junction 16 passes signals originating from apparatus at remote locations to a decoder 18 which decodes the tone-encoded command codes received from remotely-located transmitters by demodulating the signals, and applies the decoded information to CPU 10, where the point of origin is identified. The CPU then interrupts its normal sequence long enough to carry out the received control command in accordance with information stored in interconnect matrix store 12 utilizing address signals stored in control state and digital address store 11.

Digital signals originated within central apparatus 25 and supplied through junction 16 are received by receiver-decoders 20 at various remote locations 22 within the facility. Each of these receiver-decoders may typically be of the type disclosed and claimed in Eichelberger and Garratt application Ser. No. 748,932, filed Dec. 9, 1976 now U.S. Pat. No. 4,091,361, issued May 23, 1978, and assigned to the instant assignee. When the digital signal is received at the intended receiver-decoder a predetermined number of times (e.g. two) out of the number of times it is consecutively generated (e.g. three), control signals are produced by the receiver-decoder to actuate the associated controlled apparatus 21 in accordance with the functions assigned. By transmitting control signals in repetitive fashion, the redundant and cyclic nature of the transmissions makes it safe to assume that the individual load points will eventually achieve the states assigned to them at memory store 11, allowing readout of the overall state of the system from the central store rather than having to transmit acknowledging signals back from each control point.

A plurality of transmitters 23 each comprises a tone-encoded signal generator to which a simple control code is added; that is, the identification of each transmitter 23 is preset so as to generate the same tone-encoded address signal each time the transmitter is actuated, while a selected one of several tone-encoded control signals, depending upon the control function desired by a person at one of a plurality of remote locations 22, is produced immediately after the identification code in accordance with the keys of a control keyboard 24 depressed manually at the remote location. This keyboard (or, in the alternative, sensing and encoding means responsive to the condition of controlled apparatus 21) actuates transmitter 23 coupled thereto to furnish to CPU 10 a control code corresponding to the new, selected condition of controlled apparatus 21 at the appropriate one of remote locations 22 (although condition of controlled apparatus 21 at any other remote location may also be modified by the same transmitter simply by pre-programming such operation into the system). A modified telephone-type key pad may, if desired, suffice as keyboard 24 for each of transmitters 23.

To recapitulate operation, an FSK modulated signal generated by programmable waveform generator 14 in response to signals from CPU 10 is injected through junction 15 and 16 in sequence, onto distribution circuits in the facility in which the invention is installed, to ultimately reach receiver-decoders 20 wherein the signals appropriate to an individual receiver are received and decoded. Digital signals from remote transmitters 23, for individual adjustment of controlled apparatus 21, are routed through junction 16 to decoder 18, where the information representing point of origin and command code is decoded. This information is supplied to the CPU, interrupting its normal sequence long enough to carry out the control command received from any one of transmitters 23. The action in response to this control command is carried out by selecting a designated control state from interconnect matrix store 12 and combining it with an appropriate address or addresses from control state and digital address store 11. The ensuing command from central apparatus 25 is transmitted to the selected individual receiver-decoders 20 by an appropriately encoded signal.

The information retrieved at any given time from control state and digital address store 11 essentially constitutes a control state map. A number of such maps are stored for use therein, and selected maps are put into effect by CPU 10 at appropriate times. For the circuit configuration illustrated in FIG. 1, a given set of maps is associated with separate carrier frequencies used for individual branch circuits (i.e., remote locations). In normal operation, these maps are put into effect by CPU 10 as determined by an executive program (designated "EXEC" for flow chart nomenclature) and may be responsive to time of day or other information. As shown by the flow chart of FIG. 2, the sequence of reading out information appropriate to individual control states, and transmitting appropriate signal codes to the individual receiver-decoders, is a sequential iterative process. The format of the digital signal employed, as illustrated in FIG. 5, is such that many individual control states can be put into effect using a single carrier frequency.

Figure 2:
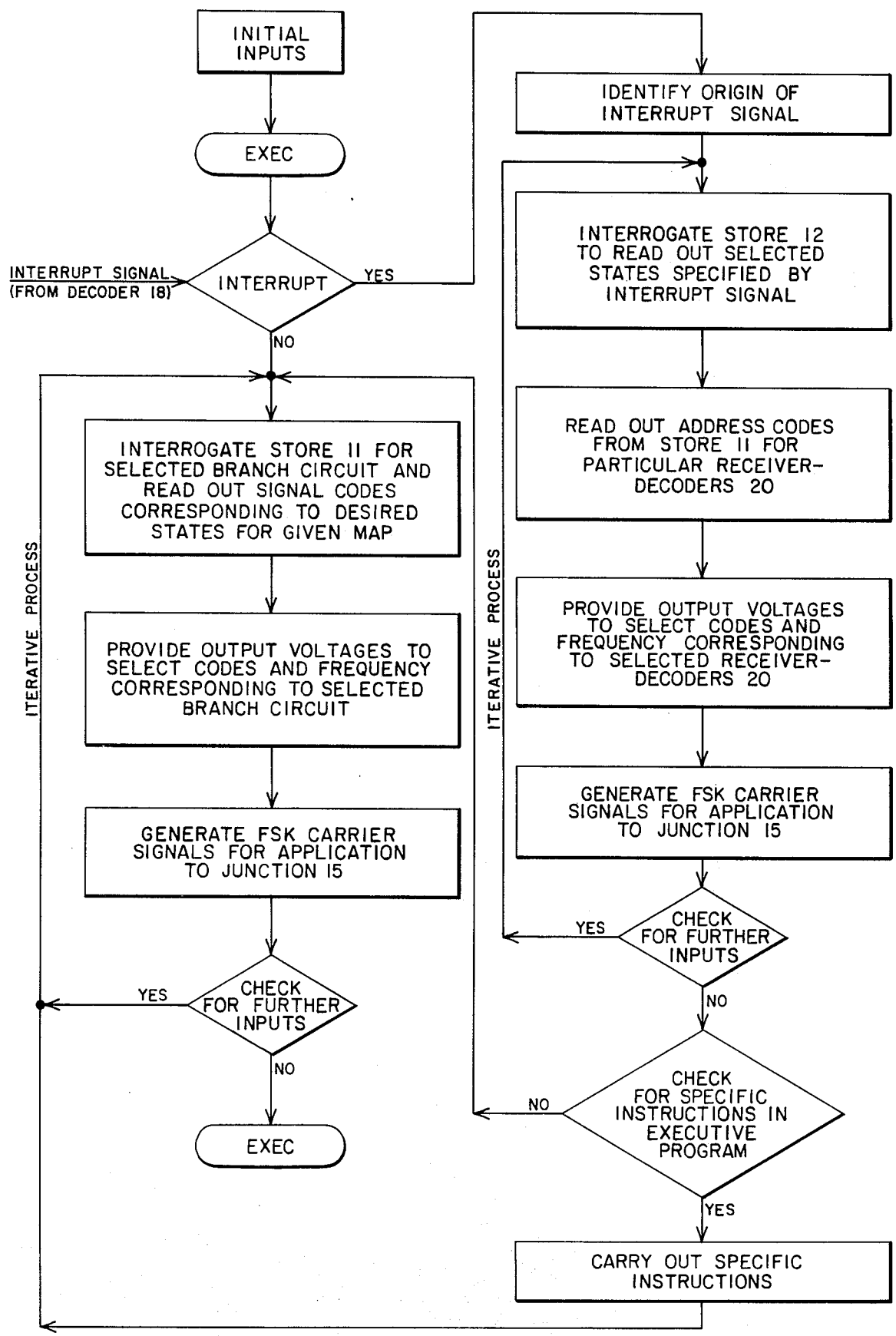
FIG. 2 is a flow chart to supplement the description of operation of the apparatus shown in FIG. 1.

The normal sequence of control, as indicated in FIG. 2 for the apparatus of FIG. 1, is subject to an interrupt mode initiated by an interrupt signal transmitted from any one of remote transmitting stations 23. This tone encoded signal is converted by decoder 18 into binary coded digital format and applied to the interrupt line of CPU 10. Origin of the interrupt signal is indicated by the address code supplied at transmitter 23. Receipt of this interrupt signal causes CPU 10 to interrupt interrogation of control state and digital address store 11 and interrogate interconnect matrix store 12 where signal codes corresponding to the desired states specified by the interrupt signal are stored. These codes are then transmitted to the particular receiver-decoders 20 whose states are to be modified in accord with the interrupt signal. This is a sequential iterative process, at the end of which a check is made for specific instructions residing in the executive program. These instructions may comprise, for example, an instruction for CPU 10 to proceed with a complementary map from control state and digital address store 11 for the purpose of placing a time delay or hold into effect for those loads 21 whose states have been adjusted by the interrupt signal.

Figure 3:
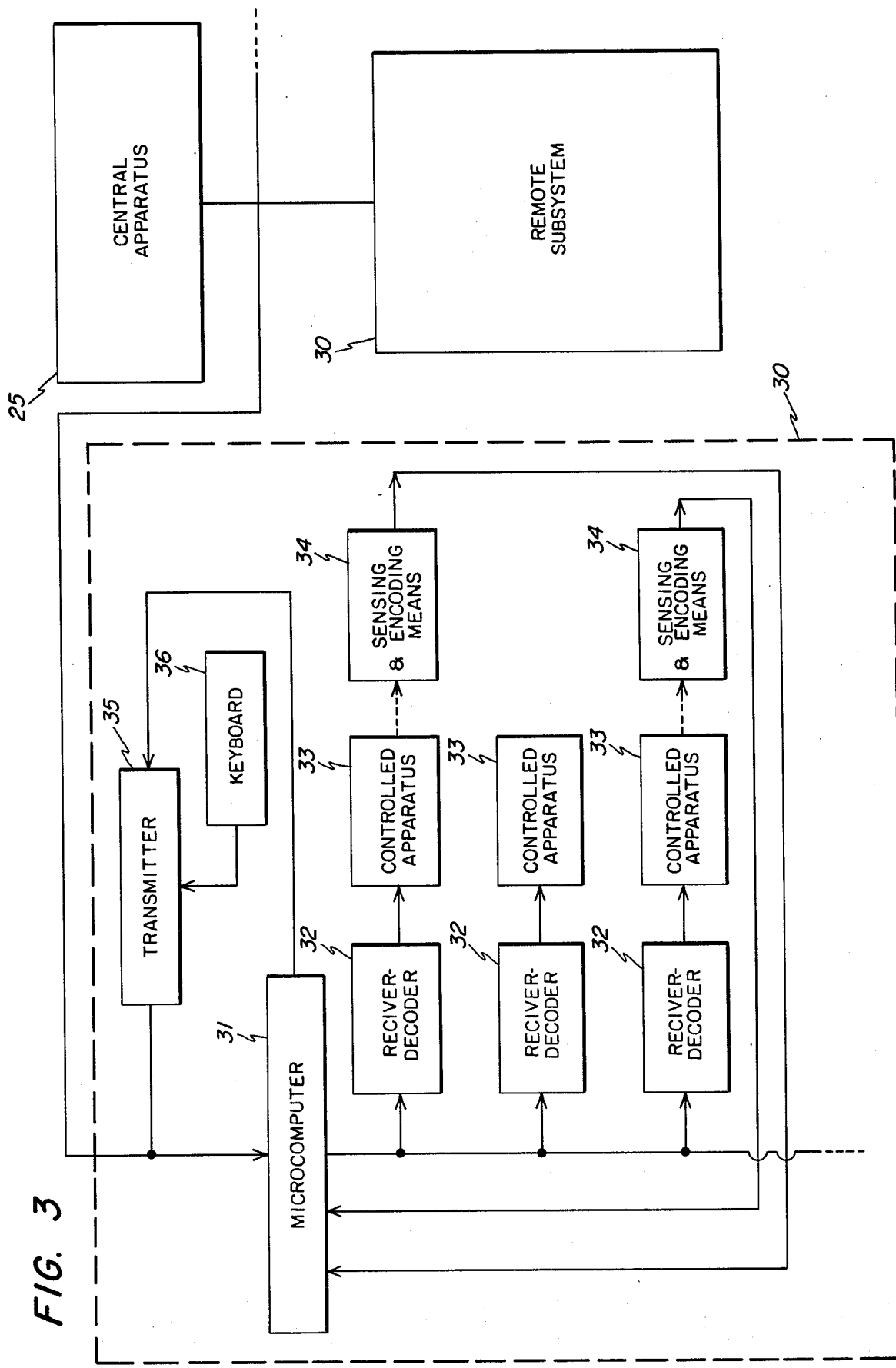
FIG. 3 is a schematic diagram of a signal distribution system, connected in accordance with the instant invention, employing hierarchical distribution.

FIG. 3 illustrates a typical hierarchical system in which signals furnished from central apparatus 25, such as shown in greater detail in FIG. 1, are distributed to remote subsystems 30, one of which is shown in detail. Each remote subsystem 30 includes an individual microcomputer 31 which establishes a normal sequence of operation within its individual remote subsystem. Specifically, signals from central apparatus 25, transmitted over either power or communication circuits, are supplied by microcomputer 31 in each remote subsystem to predetermined ones of a plurality of receiver-decoders 32 having controlled apparatus 33 connected thereto within the respective remote subsystem. Those skilled in the art will recognize that since each remote subsystem includes an individual microcomputer, the signals transmitted from central apparatus 25 can be limited to tone codes or simple combinations of tone codes and digital codes. Receiver-decoders 32 are typically of the type designated receiver-decoder 20 in FIG. 1. Respective sensing and encoding means 34 may be mechanically or electrically coupled to predetermined ones of controlled apparatus 33, respectively, for supplying signals to microcomputer 31 in accordance with the sensed condition of the controlled apparatus coupled thereto. However, even in absence of sensing and encoding means 34, microcomputer 31 can make available from the stores information concerning the assumed state of any of controlled apparatus 33. Thus output signals representing the overall state of the subsystem (e.g. real and reactive power, peak load versus time, etc.), or a portion thereof, may be supplied to a transmitter 35 which is similar to transmitter 23 of FIG. 1 (i.e., a tone-encoded signal generator to which a simple control code is added). More specifically, the identification of transmitter 35 in any given subsystem 30 is preset so as to generate the same tone-encoded address signal unique to that transmitter each time the transmitter is actuated either by a manually-operated keyboard 36 or by microcomputer 31, and a selected one of a plurality of tone-encoded control signals, depending upon the actuated keys of the keyboard or the sensed condition of the controlled apparatus is produced after the identification code.

Microcomputer 31 therefore produces a specific condition code depending upon conditions within the given subsystem 30. This condition code is transmitted back to central apparatus 25 wherein it is accepted and stored by the CPU in an auxiliary store for later use as necessary. Those skilled in the art will appreciate that, while only three receiver-decoders 32 are illustrated in subsystem 30, a larger number may be employed as necessary to completely automate operation of the remote subsystem.

Microcomputer 31 in each remote subsystem 30 receives signals from central apparatus 25 and passes them on to the receiver-decoders within the subsystem. Only the addressed receiver-decoder responds to the signal from central apparatus 25. However, the receiver-decoders within any given subsystem may be assigned a common address and be controlled by microcomputer 31 to perform their functions in a predetermined sequence, thereby obviating any need for a completely different digital word to be transmitted by central apparatus 25 each time it is necessary to alter the state of any controlled apparatus 33 within any remote subsystem 30. A typical microcomputer 31 for carrying out the necessary functions may comprise an Intel 8080A microprocessor and an Intel 8708 control state and digital address store.

Figure 4:
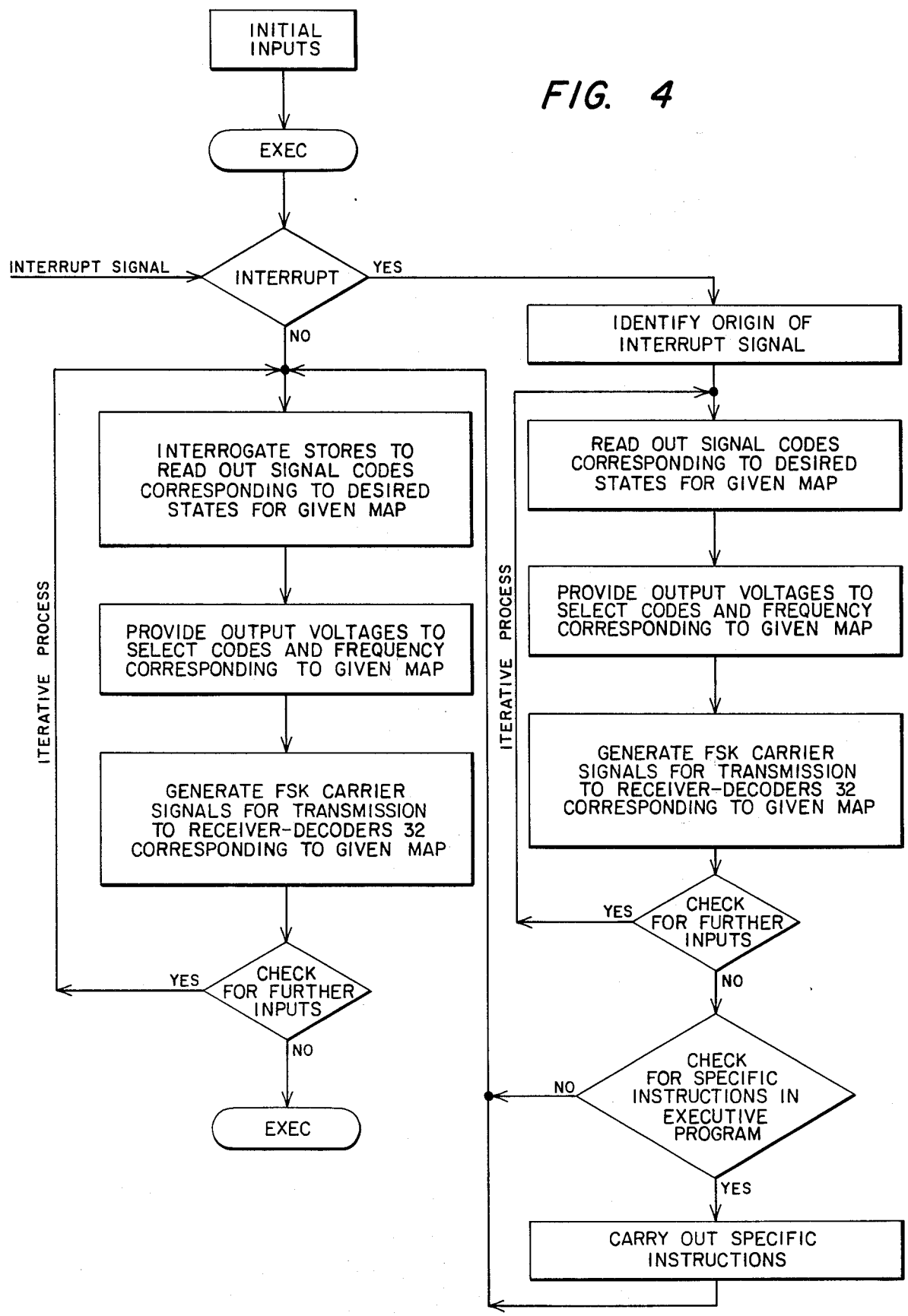
FIG. 4 is a flow chart to supplement the description of operation of the apparatus shown in FIG. 3.

The flow chart of FIG. 4 illustrates several possible modes of operation for the apparatus of FIG. 3, depending upon the communications protocol established. The normal mode of operation is similar to that of the branch circuit system shown in FIG. 1. Various interrupt modes are possible, depending upon the source of the interrupt signal. This may originate at central apparatus 25 and be transmitted to a remote subsystem 30 in the form of a tone-encoded signal utilizing tone code generator 13 in conjunction with programmable waveform generator 14 shown in FIG. 1. In this instance, the central apparatus initiates the signal in order to modify the process normally carried out by the specific remote subsystem addressed. Modification maps for the subsystem are stored at the subsystem microcomputer 31.

An alternative mode of operation for the hierarchical system shown in FIG. 3 involves direct communication between individual subsystems 30, using transmitter 35. Microcomputer 31 of a first subsystem 30 initiates the signal in order to provide a specific input to a second subsystem 30 corresponding to changes in state of the first subsystem. An example of this type of operation is use of changes in state of a lighting subsystem as a control input to modify the state of a heating, ventilating and air conditioning subsystem, or the use of modification maps for the lighting subsystem in order to reduce the peak requirement on the heating, ventilating and air conditioning subsystem. Use of this type of anticipatory signal in subsystem control is a feature of the distributed control system described herein which is not feasible to accomplish with prior control systems.

Reviewing the flow chart of FIG. 4, if an interrupt signal is not received by microcomputer 31, the control state and digitial address stores associated therewith are read out to generate signal codes corresponding to desired states for a given map. The microcomputer produces output voltages which select codes and frequency corresponding to the given map, and generates FSK carrier signals for transmission to receiver-decoders 32 as indicated in the given map. If there are further inputs, this process repeats itself. If there are no further inputs, microcomputer 31 carries out the executive program. If an interrupt signal is received, microcomputer 31 identifies the origin of the interrupt signal and reads out signal codes corresponding to desired states for the given map. Output voltages are then supplied by microcomputer 31 to select appropriate codes and frequency corresponding to particular receiver-decoders 32 according to the given map. FSK carrier signals are then generated for transmission to receiver-decoders 32 as called for on the given map. If there are further interrupt inputs, this process is repeated. However, if there are no further interrupt inputs, the microcomputer checks for specific instructions in the executive program. If there are such instructions, they are carried out and the system returns to its normal mode of operation. If there are no specific instructions in the executive program, the system is likewise returned to normal operation.

In FIG. 5, a typical code signal transmitted by central apparatus 25 of FIGS. 1 and 2 is illustrated with respect to 120 Hz clock pulses conveniently derived from the 60 Hz A.C. power line by conventional techniques. Those skilled in the art will appreciate that higher clock frequencies may, alternatively, be derived by the 60 Hz A.C. line, though with some diminution in noise immunity. If communication circuits are used, the preferable signalling rate is considerably higher than 120 Hz.

In FIG. 5, the initial portion of the digital word comprises a predetermined number of logic ZEROs, which preferably corresponds to the number of bits in the remote location address, followed by a flag bit (a ONE) to specify start of the function information. Although the function code in the illustrated word is shown comprising two bits, those skilled in the art will appreciate that as many bits as needed to carry out the desired functions may be added to the word, as long as the apparatus employed in the system has the capacity to accommodate the number of bits employed. The function code is followed by the remote location address, which ensures that the intended functions are carried out by the desired remote receiver-decoders, and only those receiver-decoders. In the case of a hierarchical system, a single, tone-encoded remote location address may be employed for all the receiver-decoders in any single remote subsystem 30, with the function code including, in a predetermined sequence, the specific functions to be carried out by each controlled apparatus 33 in subsystem 30. In such case, the remote subsystem microcomputer 31 controls the sequence in which receiver-decoders 32 actuate their respective controlled apparatus 33 to carry out the specified functions.

The foregoing describes a method and apparatus for generating redundant address and function codes for transmission to a plurality of receiving stations, with function data being provided over power distribution or communication circuits to selected receiving stations. The system also provides for transmitting control signals, generated at any of a plurality of receiving stations, back to a central control location over the power distribution or communication circuits for purposes of controlling a pre-programmed combination of loads.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A system for performing, from a central location, a selected one of a plurality of electrical functions at a selected one of a plurality of remote locations, comprising:

a central processing unit at said central location;
means at said central location for storing a plurality of digital address and functions codes, and electrical function control state information;
encoding means responsive to the control information from said storing means upon enablement by said central processing unit for generating a programmable combination of frequency and digital address and function codes received from said storing means;
means for directly coupling each of said remote locations to said encoding means;
at least one receiver-decoder means at each of said remote locations, each of the respective receiver-decoder means within each remote location having a common address code unique to said remote location;
means responsive to each of said receiver-decoder means, respectively, for performing said selected one of the plurality of electrical functions at said selected one of the plurality of remote locations; and
transmitting means at at least one predetermined one and less than all of said remote locations for transmitting, independent of transmission from said encoding means to said receiver-decoder means, tone-encoded signals back to said central processing unit for obtaining a pre-programmed combination of electrical function control states from said storing means and causing said encoding means to generate a digital address and function code and a frequency for coupling to said receiver-decoder means by said coupling means for modifying the conditions of those predetermined ones of said means responsive to each of said receiver-decoder means selected from said storing means responsive to the signals transmitted back to said central processing unit from said at least one remote location.

2. The apparatus of claim 1 wherein said means coupling each of said remote locations to said encoding means comprises an A.C. power distribution circuit.

3. The apparatus of claim 2 wherein said encoding means comprises means generating an FSK modulating signal on a carrier of frequency at least two orders of magnitude higher than the frequency of said A.C. power.

4. A system for performing, from a central location, a selected one of a plurality of electrical functions at a selected one of a plurality of remote locations, comprising:

a central processing unit as said central location;

means at said central location for storing a plurality of digital address and function codes and electrical function control state information;

encoding means responsive to the control information from said storing means upon enablement by said central processing unit for generating a programmable combination of frequency and digital address and function code received from said storing means;

means for directly coupling each of said remote locations to said encoding means;

at least one receiver-decoder means at each of said remote locations, each of the respective receiver-decoder means within each remote locating having its own unique address code;

means responsive to each of said receiver-decoder means, respectively, for performing said selected one of the plurality of electrical functions at said selected one of the plurality of remote locations; and transmitting means at at least one predetermined one and less than all of said remote locations for transmitting, independent of transmission from said encoding means to said receiver-decoder means, tone-encoded signals back to said central processing unit for obtaining a pre-programmed combination of electrical function control states from said storing means and causing said encoding means to generate a digital address and function code and a frequency for coupling to said receiver-decoder by said coupling means for modifying the condition of those predetermined ones of said means responsive to each of said receiver-decoder means selected from said storing means responsive to the signals transmitted back to said central processing unit from said least one remote location.

5. The apparatus of claim 4 wherein said means coupling each of said remote locations to said encoding means comprises computer means at each of said remote locations controllably supplying input signals to said receiver-decoder means at said each of said remote locations, respectively, in response to signals from said encoding means.

6. The apparatus of claim 5 including sensing means at at least one of said remote locations for detecting whether said selected one of said plurality of electrical functions has been performed by a predetermined one of said means responsive to each of said receiver-decoder means, and means coupling said sensing means at said one of said remote locations to said computer means at said one of said remote locations.

7. The apparatus of claim 4 wherein said means coupling each of said remote locations to said encoding means comprises an A.C. power distribution circuit.

8. The apparatus of claim 7 wherein said means coupling each of said remote locations to said encoding means includes computer means at each of said remote locations coupled to said A.C. power distribution circuit, said computer means at said each of said remote locations controllably supplying input signals to said receiver-decoder means at said each of said remote locations, respectively, in response to signals from said encoding means.

9. The apparatus of claim 8 including sensing means at at least one of said remote locations for detecting whether said selected one of said plurality of electrical functions has been performed by a predetermined one of said means responsive to each of said receiver-decoder means, and means coupling said sensing means at said one of said remote locations to said computer means at said one of said remote locations for generating condition responsive data for transmission back to said central processing unit.

* * * * *